United States Patent [19]

Kakegawa et al.

[11] Patent Number: 5,889,081
[45] Date of Patent: Mar. 30, 1999

[54] BINDER COMPOSITION FOR FRICTION MATERIALS, AND FRICTION MATERIAL

[75] Inventors: Hiroya Kakegawa, Osaka; Tokugen Yasuda; Xiangsheng Wang, both of Kyoto, all of Japan

[73] Assignee: Osaka Gas Company Limited, Osaka, Japan

[21] Appl. No.: 545,625

[22] PCT Filed: Mar. 3, 1995

[86] PCT No.: PCT/JP95/00344

§ 371 Date: Jan. 17, 1996

§ 102(e) Date: Jan. 17, 1996

[87] PCT Pub. No.: WO95/23833

PCT Pub. Date: Sep. 8, 1995

[30] Foreign Application Priority Data

Mar. 3, 1995 [JP] Japan .................................. 6-033628

[51] Int. Cl.$^6$ ................................ C08J 5/14; C08K 3/20; C08K 5/00; C08L 83/00
[52] U.S. Cl. .................... 523/156; 192/107 M; 523/149; 523/150; 523/152; 523/155; 523/157; 524/80; 524/81; 524/174; 524/175; 524/178; 524/183; 524/267; 524/268; 524/394; 524/588; 524/589; 524/590; 525/389; 525/393; 525/474

[58] Field of Search ....................... 523/149, 150, 523/152, 155, 157, 156; 192/107 M; 524/80, 81, 174, 175, 178, 183, 267, 268, 394, 588, 589, 590; 525/389, 393, 474

[56] References Cited

U.S. PATENT DOCUMENTS

| 4,020,226 | 4/1977  | Andrianov ................. 428/290 |
| 4,369,263 | 1/1983  | Matsushima ............... 523/152 |
| 4,658,951 | 4/1987  | Takarada .................. 523/153 |
| 5,364,513 | 11/1994 | Sekhar et al. ............. 204/243 R |
| 5,438,113 | 8/1995  | Shimozawa et al. ......... 528/25 |

FOREIGN PATENT DOCUMENTS 62-215134 9/1987 Japan .
6-306186 11/1994 Japan .

*Primary Examiner*—Patrick D. Niland
*Attorney, Agent, or Firm*—Larson & Taylor

[57] ABSTRACT

This invention provides: (1) a hinder composition for friction materials, characterized in that it comprises a thermosetting resin and a specific organic silicon compound having phenyl groups, and (2) a friction material having as a binder composition shown in the above item (1). When used for manufacturing friction materials in the brakes and clutches for various kinds of vehicles such as automobiles, it can remarkably improve the facing and abrasion resistances of the friction material.

15 Claims, No Drawings

BINDER COMPOSITION FOR FRICTION MATERIALS, AND FRICTION MATERIAL

TECHNICAL FIELD

The present invention relates to a binder composition for friction materials, and a friction material.

When used for manufacturing friction materials in the brakes, clutches and the like for various kinds of vehicles such as automobiles, the binder composition of this invention can remarkably improve the fading and abrasion resistances of the friction material.

PRIOR ART

In recent years, there is a strong demand for improving the performance of and reducing the weight of brakes, clutches and other parts of vehicles such as automobiles because of higher power of engines and also an increasing need for decreasing the mass of automotive bodies.

In respect of these automotive parts, it has been long desired to solve or mitigate the technical problems of the fade phenomenon entailing the reduction in coefficient of friction at a high temperature operation and the judder phenomenon involving sharp variation in coefficient of friction. J. M. Herring Jr. [SAE Paper, 670146 (1967)] and Inoue et al [Research Report in Tribologist, 37, No.6, page 493 (1992)] state that the substances which have directly caused the fade phenomenon are gases, tars and the like present as heat decomposition products of cured body of thermosetting resin used as a binder or a friction controlling agent in these automotive parts.

To prevent the generation of such gases and tars, etc., the following have been heretofore proposed: 1) a friction material containing a naphthol resin as a binder (Japanese Unexamined Patent Publication Hei 4-63387), 2) a friction material containing a copna resin as a binder prepared from a condensed polycyclic aromatic compound (such as pitch) crosslinked with methylene linkage (Japanese Unexamined Patent Publication Hei 1-108492), 3) a friction material prepared by molding a mixture of pitch and a cyanic acid ester resin as a binder, followed by semi-carbonization at 250 to 650° C. (Japanese Unexamined Patent Publication Hei 5-215164, and 4) another proposal made from a different viewpoint, i.e. the adsorption of generated decomposition products on the activated carbon incorporated in the friction composition (Japanese Examined Patent Publication Sho 59-18429).

Further proposals are 5) a friction material containing an organopolysiloxane-modified phenol resin as a binder (Japanese Unexamined Patent Publication Sho 61-192711) and 6) a friction material containing a binder having a silicone oligomer incorporated therein (Japanese Unexamined Patent Publication Sho 61-77653).

However, the binders used in 1) and 2) are organic substances and undergo heat decomposition at a temperature of 400 to 500° C. although in a different degree, unavoidably involving the generation of large amounts of gases and tars. The technique 3) can preclude the generation of decomposition products indeed. However, it not only requires a high temperature of 300 to 500° C. for manufacture but also poses the problem of not allowing the use of organic reinforcing fibers which, when fibrillated, facilitate a blend with other constituents, such as aramid fibers currently used as main reinforced fibers for friction materials. The technique 4) has the drawbacks that owing to the use of activated carbon, i.e. a brittle material, the strength and endurance of friction materials are reduced and decomposition products such as tars can not be effectively adsorbed. The technique 5) presents the problem of higher costs being incurred by the modification of phenol resin. The technique 6) can not fully inhibit the decomposition of binder since there occurs the evaporation of silicone oligomer in preference to the decomposition thereof because of the presence of stable silicone oligomer.

DISCLOSURE OF THE INVENTION

A main object of the invention is to provide a binder for friction materials, the binder being easily produced even using conventional equipment, being vaporized in lesser amounts at high temperature operation and being excellent in fading resistance, abrasion resistance, etc.

Directing attention to the foregoing various prior art problems, the inventor of the present invention conducted extensive research, and found that when a mixture of a thermosetting resin and an organometallic compound, particularly an organic silicon compound having at least a Si—Si bond is used as a binder, a friction material excellent in fading resistance, abrasion resistance, etc. can be obtained. The present invention has been accomplished based on this finding.

According to the present invention, there are provided:

1. a binder composition for friction materials, characterized in that it comprises a thermosetting resin and an organometallic compound, and
2. a friction material having as a binder component the binder composition described in (1).

The constituent components for use in the present invention are described below respectively in detail.

I. Thermosetting resin

Useful thermosetting resins include, for example, novolak-type phenol resins, resol-type phenol resins, furan resins, polyimide resins, polyurethane resins, bismaleimide resins, copna resins, etc. These resins can be used either alone or in combination.

The thermosetting resins for use in the invention include the foregoing resins properly improved in properties or modified, such as cashew resins, furan-modified phenol resins, etc.

The thermosetting resin may contain pitch in an amount of not more than 30% by mass. The pitch for use is not specifically limited. Suitable pitch has a softening point (R & B method) of about 40 to about 350° C., preferably about 60 to about 150° C., and a carbonization yield of at least 40% by mass. Less than 30% by mass of pitch used scarcely affects the heat curability of the resin and contributes to increase in the carbonization yield of the mixture (reduction in the degree of volatilization at a high temperature).

Further, an organic silicon compound may be incorporated into pitch before the pitch is mixed with a thermosetting resin. In this case, it was found that the resin can be heat-cured by heating at about 250 to about 350° C. in the presence of inherently thermoplastic pitch coexisting with the organic silicon compound. The amount of the organic silicon compound to be mixed with pitch is about 1 to about 50% by mass based on the pitch. The addition of organic silicon compound increases the carbonization yield of pitch, namely the carbonization yield of the thermosetting binder composition.

II. Organometallic compound

Organometallic compounds useful in the present invention include organic silicon compounds, organic boron compounds, organic germanium compounds, organic tin compounds, organic zinc compounds, etc. The organometallic compounds can be used either alone or in combination. Among these organometallic compounds, preferred are those having the radical-forming (decomposition) temperature lower than the sublimation or vaporization temperature.

Useful organic silicon compounds for use herein include, for example, a polycarbosilane represented by the formula

$$(—SiR_2—CR_2—)_n \quad (1)$$

and a polysilane represented by the formula

$$(—SiR_2—SiR_2—)_n \quad (2)$$

In the formulae (1) and (2), the R groups are the same or different and each represents a hydrogen atom, a methyl group, an ethyl group, a phenyl group or the like, and n is about 3 to about 200, preferably about 5 to about 100.

Useful organic silicon compounds also include network phenylpolysilane. The term "network phenylpolysilane" used herein is a compound represented by the formula

(3)

wherein Ø represents a phenyl group, two bonds are represented without substituents bonded to Ø or Si, and n is about 3 to about 200, preferably about 5 to about 100.

More specific examples of organic silicon compounds of the formulae (1), (2) and (3) include dimethylpolysilane, diethylpolysilane, phenylethylpolysilane, phenylmethylpolysilane, diphenylpolysilane, network phenylpolysilane, etc. Preferred are those having a phenyl group such as phenylethylpolysilane, phenylmethylpolysilane, diphenylpolysilane, network phenylpolysilane, etc.

Also usable are organometallic compounds having part or all of Si's substituted by Ge, Sn or Pb in the formula (1), (2) or (3).

III. Condensation-promoting catalyst

When a mixture of a thermosetting resin and an organometallic compound is used as a binder, it is preferred to use a condensation-promoting catalyst for promoting the crosslinking between the thermosetting resin and the organometallic compound. Preferred condensation-promoting catalysts are as follows.

A) Amines: N,N-dimethylbenzylamine, N,N-dimethylethyleneamine, 2,4,6-tris(dimethylaminomethyl)phenol, etc.

B) Lewis acids and protonic acids: cobalt chloride, ferric chloride, zinc chloride, p-toluenesulfonic acid, etc.

C) Metals: cobalt, iron, titanium, tin, copper, zinc, etc.

D) Metallic oxides and metallic sulfides: CoO, $Co_3O_4$, $Cu_2O$, FeO, ZnO, MgO, $ZrO_2$, SnO, CuS, FeS, ZnS, MoS, etc.

Among metallic oxides or sulfides, the smaller the oxidation number of the metal atom is, the more preferable they are, among the same metals (e.g. $Cu_2O$ is more desirable than CuO.)

When the condensation-promoting catalyst to be mixed with the thermosetting resin and organometallic compound is solid, the smaller the particle size is, the higher the effect is. Since ultrafine catalysts are expensive, it is desirable to use a particulate catalyst having a particle size of preferably not larger than 10 µm, more preferably not larger than 3 µm.

IV. Proportions of thermosetting resin and organometallic compound

The proportions of the thermosetting resin (when pitch is used, the complex containing pitch is treated as a thermosetting resin) and the organometallic compound are approximately 99.99 to 70% by mass of the former and approximately 0.01 to 30% by mass of the latter, preferably approximately 99.95 to 80% by mass of the former and approximately 0.05 to 20% by mass of the latter, more preferably approximately 99.90 to 90% by mass of the former, and approximately 0.1 to 10% by mass of the latter.

The proportion of the condensation-promoting catalyst is about 0.01 to about 30% by mass, preferably about 0.1 to about 15% by mass, more preferably about 1 to about 10% by mass, based on the mixture of the organometallic compound and thermosetting resin.

If the friction material contains metals, metallic oxides, metallic sulfides, etc. as the constituent components, the amount of the condensation promoting catalyst may be reduced. In such case, the reaction can be effectively promoted by homogeneously mixing the thermosetting resin, organometallic compound and condensation-promoting catalyst, followed by mixing the components for the friction material with the homogenous mixture.

Further, when the heat-treatment is conducted at a temperature at which the mixture of the thermosetting resin, organometallic compound and condensation-promoting catalyst still maintains the characteristics of a binder, namely below a temperature at which the binder initiates a curing reaction, the reaction can partially proceed, resulting in effective increase of carbonization yield of the binder.

V. Method of mixing a thermosetting resin, organometallic compound and condensation-promoting catalyst Methods of mixing powders of these substances when they are solid at room temperature are as follows.

A method is available wherein the powders are mixed together in a solvent such as chloroform, chlorobenzene, ethanol or the like, and the solvent is distilled off from the mixture. Also available is a method wherein when pitch is used, the pitch is heated to give a melt, and the melt is mixed with an organometallic compound. When use is made of a thermosetting resin melting at 100 to 230° C., the resin may be mixed with an organometallic compound. The addition of organometallic compound in the synthesis process of thermosetting resin is effective. When the thermosetting resin is liquid at room temperature, the organometallic compound may be mixed directly with the resin. In these cases, the obtained mixture is partly reacted and the residue remains unreacted.

VI. Components for use in preparing a friction material

To prepare a friction material for brakes, clutches and the like, the binder composition, a conventional friction controlling agent and reinforced fiber are mixed and the mixture is molded in the conventional manner, followed by heat treatment.

The amount of the binder composition to be used is about 5 to about 25% based on the combined mass of friction controlling agent and reinforced fiber.

Examples of the friction controlling agent are powders or particles of metals such as copper, brass, bronze, iron, stainless steel, etc., and powders or particles of inorganic substances such as graphite, $BaSO_4$, $CaCO_3$, $MgCO_3$, silica, alumina, magnesia, chromium oxide, wollastonite, diatomaceous earth, dolomite, molybudenum sulfide, calcium fluoride, etc.

When a metal powder and/or particles are used as a friction controlling agent, the amount of the agent to be used is preferably about 5 to about 80% by mass, more preferably about 10 to about 50% by mass, based on the friction material, although depending on the kind of metal.

When graphite is used as a friction controlling agent, its amount is preferably about 0.5 to about 30% by mass, more preferably about 3 to about 20% by mass, based on the components for the friction material (friction controlling agent+reinforced fibers).

Usable as the friction controlling agent are powders or particles of organic substances such as cashew dust, rubber dust, etc. and cured products of thermosetting resins. Useful friction controlling agents also include phenol resins, cashew resins and the like (i.e. thermosetting resins) containing an organometallic compound and cured at about 200 to about 350° C., cured products of pitch containing an organometallic compound, etc.

These friction controlling agents may be used either alone or in combination according to the properties required of the friction material.

A cured product of the binder composition containing a conventional phenol resin or cashew resin as the thermosetting resin according to the invention can be obtained by curing the binder composition at a temperature of about 130 to about 300° C. (preferably about 150 to about 250° C.), followed by post-cure at a temperature of about 200 to about 350° C. (preferably about 220 to about 300° C.) for about 6 to about 30 hours. Preferably the thus obtained cured product is crushed for the adjustment of particle size to about 1 $\mu$m to about 1 mm before use.

Further, useful friction controlling agents include a product prepared by admixing the organic metallic compound of the invention with pitch and heating the mixture for curing. Examples of the pitch useful for this purpose are petroleum-based pitch, coal-based pitch, synthetic pitch prepared from aromatic hydrocarbon such as naphthalene, acenaphthylene or the like, modified products of such pitch, any of isotropic pitch and anisotropic pitch, etc. The proportions of the pitch and the organometallic compound are approximately 99 to 50% by mass of the former and approximately 1 to 50% by mass of the latter, preferably approximately 95 to 75% by mass of the former and approximately 5 to 25% by mass of the latter. The mixing of pitch and organometallic compound can be conducted by heating the pitch into a melt and mixing the melt with the organmetallic compound, by mixing their powders, by mixing them in a solvent, or otherwise. Such cured product useful as the friction controlling agent can be prepared by curing a composition comprising a thermoplastic resin and organometallic compound at a temperature of about 200 to about 450° C. (preferably about 250 to about 400° C.), followed by post-cure at about 250 to about 450° C. for about 6 to about 30 hours. Preferably the obtained cured product is crushed for the adjustment of particle size to about 1 $\mu$m to 1 mm before use. Such cured product used as a friction controlling agent decreases the generation ratio of gases, tars and the like and increases the fading resistance compared with the cured products of phenol resin or cashew resin usually employed.

When an organic substance such as cashew dust, rubber dust, the cured product of the binder composition of the invention or the like is used as a friction controlling agent, the amount is preferably about 1 to about 30% by mass, preferably about 3 to about 10% by mass, based on the components for the friction material (friction controlling agent+reinforced fibers).

The particle size of the friction controlling agent is not specifically limited and can be properly determined according to the properties required of the friction material, and other factors. For example, when a metal is used, the particle size is about 10 $\mu$m to about 5 mm; when an inorganic substance is used, the particle size is about 1 $\mu$m to about 1 mm; and when an organic substance is used, the particle size is about 1 $\mu$m to about 1 mm.

Reinforced fibers to be used include various fibers used in combination, e.g. fibers of metals such as copper, brass, iron, stainless steel and the like, inorganic fibers such as carbon fibers, rock wool, asbestos, ceramic fibers, glass fibers and the like, organic fibers such as aramid fibers and so on. Those fibers show not only a reinforcing effect but also an effect of increasing the coefficient of friction.

The methods of mixing the components for the friction material are not critical and include a dry mixing method, a method of granulating the components using a small amount of a binder, a wet mixing method, a wet papermaking method, etc.

VII. Molding and curing of components for friction material

The mixing methods are not critical and, for example, can be carried out using a hot press under the conditions of a molding temperature of about 150 to about 400° C., preferably about 180 to about 300° C., a molding pressure of about 1 to about 50 Mpa and about 1 to about 10 minutes. In the molding process, preferably a clamping-release operation is repeated 2 to 6 times to properly perform breathing. Preheating is desirably conducted by high frequency or microwave heating before molding.

After molding, heat treatment is effected for post-cure at a temperature of about 200 to about 450° C. in the air for about 6 to about 30 hours. A high temperature treatment such as the scorch treatment conventionally performed at about 500 to about 600° C. is effective of course.

Effects of the Invention

The binder composition of the invention containing an organometallic compound can pronouncedly reduce the degree of volatilization which occurs by heat decomposition at a temperature of 490 to 800° C. in a nitrogen atmosphere and the air as compared with binder compositions free of such organometallic compound.

Consequently in the friction material containing such binder composition, the organometallic compound as mixed or reacted with the thermosetting resin generates a polyradical owing to the friction heat given off on braking and crosslinks the components, instead of vaporizing the components on decomposition, for the conversion into a polymer and for the introduction of, e.g. a Si—C bond, whereby the fading resistance of the friction material is enhanced and also the heat resistance and abrasion resistance thereof are significantly improved.

BEST MODE FOR CARRYING OUT THE INVENTION

Examples and Comparative Examples are given below to clarify the features of the present invention in further detail.

In the Examples and Comparative Examples, the volatile content was determined in the following manner.

TG-DTA determination: 10 mg of the sample was precisely weighted out, and placed on a dish made of platinum. Using "TGA50" manufactured by Shimadzu Seisakusho Ltd., the sample as heated in a stream of 50 ml/min of nitrogen at a heating rate of 10° C./min from room temperature to 490° C. and 800° C., and the reduction in mass (volatile loss) (%) was determined (volatile content). When air was used in lieu of the nitrogen, the flow rate of air was the same as that of the nitrogen.

EXAMPLE 1

A network phenylpolysilane (weight-average molecular weight MW 6184, dispersion degree MW/MN 2 27, decomposition temperature 365° C., product of Osaka Gas Co., Ltd.) (5 parts by mass) was added to 100 parts by mass of a nonolak-type phenol resin (product of Cashew Co., Ltd., lot no. "NR-2235", containing 10% of a hexamine-type curing agent), followed by uniform mixing in powder form. The obtained mixture was cured in air at 170° C. for 20 minutes, and then postcured in air at 200° C. for 6 hours.

The obtained phenol resin-polysilane complex was ground to about 60 mesh, and the volatile content of the ground product was determined in a nitrogen stream at 490° C. and 800° C.

Table 1 shows the results of this Example, Examples 2 to 7 and Comparative Examples 1 to 4.

EXAMPLE 2

A ground product of a phenol resin-polysilane complex was prepared in the same manner as in Example 1 with the exception of using the network polysilane in an amount of 3 parts by mass. The volatile content of the ground product was determined in a nitrogen stream at 490° C. and 800° C.

EXAMPLE 3

A ground product of a phenol resin-polysilane complex was prepared in the same manner as in Example 1 with the exception of using 5 parts by mass of ciphenylpolysilane (weight-average molecular weight MW 1756, dispersion degree MW/MN 4.69, decomposition temperature 373° C., product of Osaka Gas Co., Ltd.) in lieu of the network polysilane. The volatile contact of the ground product was determined in a nitrogen stream at 490° C. and 800° C.

EXAMPLE 4

A ground product of a phenol resin-polysilane complex was prepared in the same manner as in Example 1 with the exception of using 100 parts by mass of a resol-type phenol resin (trade mark "S-899", product of Kanebo Co., Ltd.) in lieu of the novolak-type phenol resin. The volatile content of the ground product was determined in a nitrogen stream at 490° C. and 800° C.

EXAMPLE 5

A ground product of a phenol resin-polysilane complex was prepared in the same manner as in Example 1 with the exception of using 100 parts by mass of a resol-type phenol resin in lieu of the novolak-type phenol resin and using the network phenylpolysilane in an amount of 10 parts by mass. The volatile content of the ground product was determined in a nitrogen stream at 490° C. and 800° C.

EXAMPLE 6

A ground product of a phenol resin-polysilane complex was prepared in the same manner as in Example 1 with the exception of using the network phenylpolysilane in an amount of 25 parts by mass. The volatile content of the ground product was determined in a stream of air at 490° C. and 800° C.

EXAMPLE 7

(1) Preparation of polysilane/pitch complex A

The same diphenylpolysilane as in Example 3 (10 parts by mass) was added to 100 parts by mass of a straight coal tar pitch (softening point 84.2° C., quinoline-insoluble matter 5.4% by mass, benzene-insoluble matter 22.7% by mass), and the mixture was thermally copolymerized in an autoclave in a nitrogen atmosphere at 350° C. for 3 hours, giving polysilane/pitch complex A.

(2) Preparation of polysilane/phenol resin complex B

The same diphenylpolysilane as in Example 3 (10 parts by mass) was added to 100 parts by mass of the same novolak-type phenol resin as in Example 1, followed by uniform mixing in powder form to obtain polysilane/phenol resin complex B.

(3) Preparation of complex C

The above complex A (3 parts by mass) and 7 parts by mass of the above complex B were uniformly mixed in powder form, and the mixture was cured in air at 240° C. for 12 hours, giving complex C.

(4) Determination of volatile content of complex C

The above obtained complex C was ground, and the volatile content of the ground product was determined in the same manner as in Example 1 in a nitrogen stream at 490° C. and 800° C.

COMPARATIVE EXAMPLE 1

Without adding the network phenylpolysilane, the same novolak-type phenol resin as in Example 1 was cured by heating in air at 170° C. for 20 minutes, and then postcured in air at 200° C. for 6 hours. The cured product was ground to about 60 mesh, and the volatile content of the ground product was determined in a nitrogen stream at 490° C. and 800° C.

COMPARATIVE EXAMPLE 2

Without adding the network phenylpolysilane, the same resol-type phenol resin as in Example 4 was cured by heating in air at 170° C. for 20 minutes, and then postcured in air at 200° C. for 6 hours. The obtained phenol resin was ground to about 60 mesh, and the volatile content of the ground product was determined in a nitrogen stream at 490° C. and 800° C.

COMPARATIVE EXAMPLE 3

Without adding the network phenylpolysilane, the same novolak-type phenol resin as in Example 6 was cured by heating in air at 170° C. for 20 minutes, and then postcured in air at 200° C. for 6 hours. The cured product was ground to about 60 mesh, and the volatile content of the ground product was determined in a stream of air at 490° C. and 800° C.

COMPARATIVE EXAMPLE 4

The same straight coal tar pitch as in Example 7 (100 parts by mass) was heated in an autoclave in a nitrogen atmosphere at 350° C. for 3 hours. The obtained product (3 parts by mass) and 7 parts by mass of a powdery novolak-type phenol resin were uniformly mixed at room temperature in powder form, and the mixture was cured in air at 240° C. for 12 hours, giving a pitch/phenol resin complex. The obtained complex was ground to about 60 mesh, and the volatile content of the ground product was determined in a nitrogen stream at 490° C. and 800° C.

TABLE 1

| | Atmosphere for determination | Volatile content (%) | |
|---|---|---|---|
| | | 490° C. | 800° C. |
| Ex. 1 | Nitrogen | 10.3 | 27.6 |
| Ex. 2 | Nitrogen | 11.5 | 30.3 |

TABLE 1-continued

| | Atmosphere for determination | Volatile content (%) | |
|---|---|---|---|
| | | 490° C. | 800° C. |
| Ex. 3 | Nitrogen | 13.5 | 30.5 |
| Ex. 4 | Nitrogen | 11.4 | 27.5 |
| Ex. 5 | Nitrogen | 13.5 | 33.5 |
| Ex. 6 | Air | 28.8 | 91.1 |
| Ex. 7 | Nitrogen | 18.0 | 27.3 |
| Comp. Ex. 1 | Nitrogen | 11.1 | 40.3 |
| Comp. Ex. 2 | Nitrogen | 12.7 | 35.1 |
| Comp. Ex. 3 | Air | 49.9 | 99.5 |
| Comp. Ex. 4 | Nitrogen | 22.4 | 45.3 |

The results shown in Table 1 reveal that according to the present invention, the carbonization yield of the binder composition is increased by the introduction of the Si—C bond, and thereby the heat resistance of the friction material is remarkably improved.

For example, comparing Example 1 (combined use of a novolak-type phenol resin and a network phenylpolysilane) with Comparative Example 1 (single use of a novolak-type phenol resin), the volatile loss at a high temperature was markedly reduced in Example 1.

Further, comparing Example 4 (combined use of a resol-type phenol resin and a network phenylpolysilane) with Comparative Example 2 (single use of a resol-type phenol resin), the volatile loss at a high temperature was markedly reduced in Example 4.

Furthermore, comparing Example 6 (combined use of a novolak-type phenol resin and a network phenyl polysilane) with Comparative Example 3 (single use of a novolak-type phenol resin), the volatile loss in air (oxidation wastage amount) at a high temperature was markedly reduced in Example 6.

Moreover, comparing Example 7 (combined use of a pitch, a diphenylpolysilane and a novolak-type phenol resin) with Comparative Example 4 (combined use of a pitch and a novolak-type phenol resin), the volatile loss in a nitrogen atmosphere at a high temperature was markedly reduced in Example 7.

EXAMPLE 8

A resol-type phenol) resin (product of Kanebo Co., Ltd., lot no. "S-895") (100 parts by mass) and 10 parts by mass of the same network phenylpolysilane as in Example 1 were uniformly mixed in powder form. Ethanol (100 parts by mass) was added to the obtained mixture, followed by stirring at room temperature. The solvent was removed using an evaporator, and the residue was dried in a vacuum dryer at 40° C. for 4 hours. The obtained dry product was cured by maintaining in a nitrogen atmosphere at 250° C. for 1 hour. The obtained phenol resin-polysilane complex was ground to about 60 mesh, and the volatile content of the ground product was determined in a nitrogen stream at 800° C.

Table 2 shows the results of this Example, Examples 9 to 14 and Comparative Example 5.

EXAMPLE 9

The same resol-type phenol resin as in Example 8 (100 parts by mass) and 10 parts by mass of the same network phenylpolysilane as in Example 1 were uniformly mixed in powder form. To the mixture (100 parts by mass) was added 3 parts by mass of $ZnCl_2$ as a condensation-promoting catalyst and 100 parts by mass of ethanol, followed by stirring at room temperature. The solvent was removed using an evaporator and the residue was dried in a vacuum dryer at 40° C. for 4 hours. The obtained dry product was cured by maintaining in a nitrogen atmosphere at 250° C. for 1 hour. The obtained phenol resin-polysilane complex was ground to about 60 mesh, and the volatile content of the ground product was determined in a nitrogen stream at 800° C.

EXAMPLES 10 TO 14

A ground product was prepared in the same manner as in Example 9 with the exception of using 3 parts by mass of $CoCl_2.6H_2O$ (Example 10), $FeCl_3.6H_2O$ (Example 11), p-tolunesulfonic acid.$1H_2O$ (Example 12), 2,4,6-tris(N,N-dimethylaminomethyl)phenol (Example 13) or N,N-dimethylbenzylamino (Example 14) in lieu of $ZnCl_2$. The volatile content of the ground product was determined in a nitrogen stream at 800° C.

COMPARATIVE EXAMPLE 5

Ethanol (100 parts by mass) was added to 100 parts by mass of the same resol-type phenol resin as in Example 8, followed by stirring. The mixture was dried and cured under the same conditions as in Example 1.

The obtained dry product was cured by maintaining in a nitrogen atmosphere at 250° C. for 1 hour. The obtained phenol resin-polysilane complex was ground to about 60 mesh, and the volatile content of the ground product was determined in a nitrogen stream at 800° C.

TABLE 2

| | Condensation-promoting catalyst | Volatile loss at 800° C. (%) |
|---|---|---|
| Ex. 8 | None | 44.0 |
| Ex. 9 | $ZnCl_2$ | 40.2 |
| Ex. 10 | $CoCl_2.6H_2O$ | 42.2 |
| Ex. 11 | $FeCl_3.6H_2O$ | 41.9 |
| Ex. 12 | p-Tolenesulfonic acid.$1H_2O$ | 36.5 |
| Ex. 13 | 2,4,6-tris(N,N-dimethylamino-methyl)phenol | 38.1 |
| Ex. 14 | N,N-dimethylbenzylamine | 40.0 |
| Comp. Ex. 5 | (Single use of resol-type phenol resin) | 47.7 |

EXAMPLE 15

The same network phenylpolysilane as in Example 1 (10 parts by mass) was added to 100 parts by mass of the same resol-type phenol resin as in Example 8, followed by uniform mixing at room temperature. The obtained mixture was cured by maintaining in a nitrogen atmosphere at 250° C. for 1 hour. The obtained phenol resin-polysilane complex was ground to about 60 mesh, and the volatile content of the ground product was determined in a nitrogen stream at 800° C.

Table 3 shows the results of this Example, Examples 16 to 29 and Comparative Examples 6 to 8.

EXAMPLE 16

A cured phenol resin-polygermane complex was prepared in the same manner as in Example 15 using 100 parts by mass of the same resol-type phenol resin as in Example 8 and using 10 parts by mass of a network phenyl polygermane (product of Osaka Gas Co., Ltd., weight average molecular weight MW 885, dispersion degree MW/NM 2.3) in lieu of the network phenylpolysilane. The volatile content was determined in the same manner as in Example 15 in a nitrogen stream at 800° C.

EXAMPLES 17 TO 29

The same network phenylpolysilane as in Example 1 (10 parts by mass) was added to the same resol-type phenol resin as in Example 8, followed by uniform mixing at room temperature. To 100 parts by mass of the obtained mixture was added 3 parts by mass of Co powder (Example 17), Sn powder (Example 18), Ti powder (Example 19), reduced iron powder (Example 20), CoO powder (Example 21), $Co_3O_4$ powder (Example 22), $Cu_2O$ powder (Example 23), ZnO powder (Example 24), MgO powder (Example 25), $ZrO_2$ powder (Example 26), SnO powder (Example 27), ZnS powder (Example 28), of CuS powder (Example 29) as a condensation accelerating catalyst, followed by uniform mixing at room temperature. The obtained mixture was cured by maintaining in a nitrogen atmosphere at 250° C. for 1 hour. The obtained phenol resin-polysilane complex was ground to about 60 mesh, and the volatile content of the ground product was determined in a nitrogen stream at 800° C.

COMPARATIVE EXAMPLE 6

The same resol-type phenol resin as in Example 8 was cured by maintaining in a nitrogen atmosphere at 250° C. for 1 hour. The obtained cured phenol resin was ground to about 60 mesh, and the volatile content of the ground product was determined in a nitrogen stream at 800° C.

The results shown in Table 3 reveal that single use of the phenol resin results in a high volatile content.

COMPARATIVE EXAMPLE 7

$SiO_2$ of 200 mesh or less (10 parts by mass) was added to 100 parts by mass of the same resol-type phenol resin as in Example 8, followed by uniform mixing at room temperature. The obtained mixture was cured by maintaining in a nitrogen atmosphere at 250° C. for 1 hour. The cured product was ground to about 60 mesh, and the volatile content of the ground product was determined in a nitrogen stream at 800° C.

The results shown in Table 3 reveal that use of $SiO_2$ in lieu of polysilane results in a high volatile content.

COMPARATIVE EXAMPLE 8

Japanese Unexamined Patent Publication No. 77653/86 mentioned hereinbefore as a prior art document disclosed addition of a silicone-type oligomer to a binder. Thus, 10 parts by mass of a silicone-type oligomer (product of Owens Illinois (U.S.), Glass Resin GR950) was added to 100 parts by mass of the same resol-type phenol resin as in Example 8, followed by uniform mixing at room temperature. The obtained mixture was cured by maintaining in a nitrogen atmosphere at 250° C. for 1 hour. The cured product was ground to about 60 mesh, and the volatile content of the ground product was determined in a nitrogen stream at 800° C.

The results shown in Table 3 reveal that use of a silicone-type oligomer in lieu of polysilane results in a high volatile content.

TABLE 3

|  | Condensation accelerating catalyst | Volatile loss at 800° C. (%) |
|---|---|---|
| Ex. 15 | None | 40.2 |
| Ex. 16 | None | 41.9 |
| Ex. 17 | Co powder (average particle size 1 μm) | 33.9 |
| Ex. 18 | Sn powder (average particle size 3 μm) | 36.1 |
| Ex. 19 | Ti powder (350 mesh or less) | 35.0 |

TABLE 3-continued

|  | Condensation accelerating catalyst | Volatile loss at 800° C. (%) |
|---|---|---|
| Ex. 20 | Reduced iron powder (average particle size 5 μm) | 36.5 |
| Ex. 21 | CoO powder (350 mesh or less) | 36.7 |
| Ex. 22 | $Co_3O_4$ powder (350 mesh or less) | 34.7 |
| Ex. 23 | $Cu_2O$ powder (average particle size 2 μm) | 34.4 |
| Ex. 24 | ZnO powder (200 mesh or less) | 36.7 |
| Ex. 25 | MgO powder (30 mesh or less) | 35.6 |
| Ex. 26 | $ZrO_2$ powder (200 mesh or less) | 34.4 |
| Ex. 27 | SnO powder (200 mesh or less) | 35.0 |
| Ex. 28 | ZnS powder (200 mesh or less) | 37.9 |
| Ex. 29 | CuS powder (200 mesh or less) | 37.5 |
| Comp. Ex. 6 | — | 46.6 |
| Comp. Ex. 7 | — | 44.7 |
| Comp. Ex. 8 | — | 44.4 |

EXAMPLES 30 TO 33

Each of the complex binders A (Example 30), B (Example 31), C (Example 32) and D (Example 33) was prepared by adding the same polysilane as in Example 1 to a powdery phenol resin (product as Kanebo Co., Ltd., lot no. "S-895") in the proportion (parts by mass) shown in Table 4 (Example 30), or adding MgO, $ZrO_2$ or $Cu_2O$ to the phenol resin and polysilane in the proportion (part by mass) shown in Table 4 (Examples 31 to 33).

More specifically, each of the complex binders was prepared by placing the powdery phenol resin and polysilane into a blender, stirring the mixture for 1 minutes and containing stirring for further 5 minutes (complex binder A), or by placing the powdery phenol resin and polysilane in a blender, stirring the mixture for 1 minutes, further adding MgO, $ZrO_2$ or $Cu_2O$ and stirring the obtained mixture for 5 minutes (complex binders B, C and D). Each of the obtained binders was mixed with carbon fiber, aramide fiber, cashew dust, graphite, barite, rock fiber and copper powder in the proportions (part by mass) shown in Table 5, and the mixture was stirred in a rocking mixer for 1 hour to obtain an uniform mixture.

The mixture was placed in a mold and compression-molded with heating at 150° C. and 10 MPa, and the molded product was cured at 200° C. for 5 hours to obtain a sample.

The friction coefficient μ of the obtained sample was determined by the drag test and intermittent test which were conducted using a constant-rate friction tester (frictional surface: made of FC250, friction disc size: 350 mm in diameter and 10 mm in thickness, position for mounting sample: 150 mm apart from the center, sample size: 25 mm in length, 25 mm in width and 6 mm in thickness) at a circumferential speed of 8 m/s, a pressure of 1 MPa and a temperature of 300° C. according to JIS D-4411. The results are shown in Table 6.

The drag test was conducted by pressing the sample onto the frictional surface at a pressure of 1 MPa for 30 minutes. The values obtained in the first 10 minutes were excluded from the data since they were unstable. The values obtained in the last 20 minutes were employed as data.

The intermittent test was conducted by repeating 60 times the cycle which consists of pressing the sample onto the frictional surface at a pressure of 1 MPa for 20 seconds and releasing the load for 20 seconds. The values obtained in the first 10 cycles were excluded from the data since they were unstable. The values obtained in the last 50 cycles were employed as data.

COMPARATIVE EXAMPLE 9

A sample was prepared in the same manner as in Examples 30 to 33 with the exception of using a powdery phenol resin in lieu of the complex binders (see Table 5), and the friction properties of the sample were determined. Table 6 shows the results.

COMPARATIVE EXAMPLES 10 TO 13

A sample was prepared in the same manner as in Examples 30 to 33 with the exception of using complex binders E, F, G or H prepared by adding MgO or $ZrO_2$ to the powdery phenol resin in the proportion shown in Table 4 without adding polysilane, and the friction properties of the sample were determined. Table 6 shows the results.

Comparing the results of Examples 30 to 33 and the results of Comparative Examples 10 to 30 shown in Table 6, it is apparent that the variations R1 and R2 are small in Examples 30 to 33. The smaller R1 and R2 are, the less the fading phenomenon is likely to occur. Therefore, the friction material prepared using the binder composition of the present invention has an excellent fading resistance.

TABLE 4

| Complex binder No. | Mixing proportion (part by mass) | | | | |
|---|---|---|---|---|---|
| | Powdery phenol | Poly-silane | MgO | $ZrO_2$ | $Cu_2O$ |
| Ex. 30 | A | 10 | 1.4 | | |
| Ex. 31 | B | 10 | 1.4 | 0.23 | |
| Ex. 32 | C | 10 | 1.4 | | 0.23 |
| Ex. 33 | D | 10 | 1.4 | | | 0.23 |
| Comp. Ex. 10 | E | 10 | | 3.3 | |
| Comp. Ex. 11 | F | 10 | | 0.2 | |
| Comp. Ex. 12 | G | 10 | | | 0.2 |
| Comp. Ex. 13 | H | 10 | | | 3.3 |

TABLE 5

| | Example | | | | Comparative Examples | | | | |
|---|---|---|---|---|---|---|---|---|---|
| | 30 | 31 | 32 | 33 | 9 | 10 | 11 | 12 | 13 |
| Carbon fiber | 1.9 | 1.9 | 1.9 | 1.9 | 1.9 | 1.9 | 1.9 | 1.9 | 1.9 |
| Aromatic aramide fiber | 1.9 | 1.9 | 1.9 | 1.9 | 1.9 | 1.9 | 1.9 | 1.9 | 1.9 |
| Cashew dust | 6.3 | 6.3 | 6.3 | 6.3 | 6.3 | 6.3 | 6.3 | 6.3 | 6.3 |
| Graphite | 17.0 | 17.0 | 17.0 | 17.0 | 17.0 | 17.0 | 17.0 | 17.0 | 17.0 |
| Barite | 39.0 | 39.0 | 39.0 | 39.0 | 39.0 | 39.0 | 39.0 | 39.0 | 39.0 |
| Rock fiber | 2.0 | 2.0 | 2.0 | 2.0 | 2.0 | 2.0 | 2.0 | 2.0 | 2.0 |
| Copper powder | 21.4 | 21.4 | 21.4 | 21.4 | 21.4 | 21.4 | 21.4 | 21.4 | 21.4 |
| Powdery phenol | | | | | 10.5 | | | | |
| Complex binder A | 10.5 | | | | | | | | |
| Complex binder B | | 10.5 | | | | | | | |
| Complex binder C | | | 10.5 | | | | | | |
| Complex binder D | | | | 10.5 | | | | | |
| Complex binder E | | | | | | 10.5 | | | |
| Complex binder F | | | | | | | 10.5 | | |
| Complex binder G | | | | | | | | 10.5 | |
| Complex binder H | | | | | | | | | 10.5 |
| Total | 100 | 100 | 100 | 100 | 100 | 100 | 100 | 100 | 100 |

TABLE 6

| Kind of test | | Average $\mu$ | $\mu$max | $\mu$min | R1 | R2 |
|---|---|---|---|---|---|---|
| Ex. 30 | Drag | 0.410 | 0.426 | 0.410 | 0.016 | 0.018 |
| | Intermittent | 0.428 | 0.448 | 0.421 | 0.027 | |
| Ex. 31 | Drag | 0.416 | 0.424 | 0.413 | 0.011 | 0.022 |
| | Intermittent | 0.438 | 0.446 | 0.424 | 0.022 | |
| Ex. 32 | Drag | 0.432 | 0.446 | 0.418 | 0.028 | 0.014 |
| | Intermittent | 0.446 | 0.451 | 0.440 | 0.022 | |
| Ex. 33 | Drag | 0.421 | 0.429 | 0.413 | 0.016 | 0.003 |
| | Intermittent | 0.424 | 0.446 | 0.413 | 0.033 | |
| Comp. Ex. 9 | Drag | 0.394 | 0.418 | 0.375 | 0.043 | 0.139 |
| | Intermittent | 0.533 | 0.554 | 0.446 | 0.108 | |
| Comp. Ex. 10 | Drag | 0.395 | 0.418 | 0.377 | 0.041 | 0.130 |
| | Intermittent | 0.525 | 0.545 | 0.460 | 0.085 | |
| Comp. Ex. 11 | Drag | 0.393 | 0.420 | 0.380 | 0.040 | 0.133 |
| | Intermittent | 0.526 | 0.550 | 0.450 | 0.100 | |
| Comp. Ex. 12 | Drag | 0.400 | 0.422 | 0.379 | 0.043 | 0.244 |
| | Intermittent | 0.542 | 0.561 | 0.460 | 0.101 | |
| Comp. Ex. 13 | Drag | 0.412 | 0.434 | 0.381 | 0.053 | 0.145 |
| | Intermittent | 0.557 | 0.576 | 0.465 | 0.111 | |

Notes:
R1 = $\mu$max − $\mu$min
R2 = Average $\mu$ of intermittent test − Average $\mu$ of drag test

What we claim is:

1. A binder composition for friction materials, characterized in that it comprises thermosetting resin and at least one organic silicon compound selected from the group consisting of:
   i. a polycarbosilane represented by the formula (1)

   $(-SiR_2CR_2-)_n$         (1)

wherein the R groups are the same or different and each represents a hydrogen atom, a methyl group, an ethyl group or a phenyl group, at least one of R groups is a phenyl group, and n is 3 to 200;
   ii. a polysilane represented by the formula (2)

   $(-SiR_2-SiR_2-)_n$         (2)

wherein the R groups are the same or different and each represents a hydrogen atom, a methyl group, an ethyl group or a phenyl group, at least one of R groups is a phenyl group, and n is 3 to 200; and the polysilane having no monomer unit represented by the formula (2')

   $-SiR'_2-$         (2')

wherein the R' groups are the same or different and each represents a monovalent organic group having 1 to 24 carbon atoms, and at least one or R' having a hydroxyl group; and
   iii. net work phenylpolysilane represented by the formula (3)

wherein Φ represents a phenyl group, each of the lower Si atoms is attached to a phenyl group or one of lower Si atoms of the another formula (3), and n is 3 to 200.

2. A binder composition for friction materials, characterized in that it comprises a thermosetting resin and at least one organic silicon compound wherein:
   A. the thermosetting resin is a mixture of pitch and at least one member selected from the group consisting of phenol resins, furan resins, polyimide resins, polyurethane resins, bismaleimide resins, and copna resins; and
   B. the organic silicon compound is selected from the group consisting of:
   a polycarbosilane represented by the formula (1)

   $(-SiR_2-CR_2-)_n$         (1)

wherein the R groups are the same or different and each represents a hydrogen atom, a methyl group, an ethyl group or a phenyl group, at least one of R groups is a phenyl group, and n is 3 to 200;
   a polysilane consisting essentially of a structure represented by the formula (2)

   $(-SiR_2-SiR_2-)_n$         (2)

wherein the R groups are the same or different and each represents a hydrogen atom, a methyl group, an ethyl group or a phenyl group, at least one of R groups is a phenyl group, and n is 3 to 200; and
   network phenylpolysilane represented by the formula (3)

wherein Φ represents a phenyl group, each of the lower Si atoms is attached to a phenyl group or one of lower Si atoms of the another formula (3), and n is 3 to 200.

3. The binder composition for friction materials according to claim 1 wherein the thermosetting resin at at least one member selected from the group consisting of phenol resins, furan resins, polyimide resins, polyurethane resins, bismaleimide resins, copna resins, and mixtures of these resins and pitch.

4. The binder composition for friction materials according to claim 1 wherein the organic silicon polymer is at least one member selected from the group consisting of phenylethylpolysilane, phenylmethylpolysilane diiphenylpolysilane represented by the formula (2); and network phenylpolysilane represented by the formula (3).

5. The binder composition for friction materials according to claim 1 wherein the proportions of the thermosetting resin and the organic silicon compound are 99.99 to 70% by mass of the former and 0.01 to 30% by mass of the latter.

6. The binder composition for friction materials according to claim 5 wherein the proportions of the thermosetting resin and the organic silicon compound are 99.95 to 80% by mass of the former and 0.05 to 20% by mass of the latter.

7. The binder composition for friction materials according to claim 6 wherein the proportions of the thermosetting resin and the organic silicon compound are 99.90 to 90% by mass of the former, and 0.10 to 10% by mass of the latter.

8. The binder composition for friction materials according to claim 2 which further containing a condensation-promoting catalyst.

9. The binder composition for friction materials according to claim 8 wherein the condensation-promoting catalyst is at least one of amines, Lewis acids, protonic acids, metals, metallic oxides, and a metallic sulfides.

10. The binder composition for friction materials according to claim 8 wherein the condensation-promoting catalyst is a solid particle having a particle size of not larger than 10 μm.

11. The binder composition for friction materials according to claim 8 wherein the condensation-promoting catalyst is a solid particle having a particle size of not larger than 3 μm.

12. The binder composition for friction materials according to claim 8 wherein the proportion of the condensation-promoting catalyst is 0.01 to 30% by mass based on the mixture of the thermosetting resin and the organic silicon compound.

13. The binder composition for friction materials according to claim 12 wherein the proportion of the condensation-promoting catalyst is 0.01 to 15% by mass based on the mixture of the thermosetting resin and the organic silicon compound.

14. The binder composition for friction materials according to claim 13 wherein the proportion of the condensation-promoting catalyst is 1 to 10% by mass based on the mixture of the thermosetting resin and the organic silicon compound.

15. A friction material comprising the binder composition as defined in claims 3, 4, 7, 9, 11, 13, 14.

* * * * *

UNITED STATES PATENT AND TRADEMARK OFFICE
CERTIFICATE OF CORRECTION

PATENT NO. : 5,889,081
DATED : March 30, 1999
INVENTOR(S) : KAKEGAWA et al

It is certified that error appears in the above-identified patent and that said Letters Patent is hereby corrected as shown below:

On the title page, item:

-- [30] Foreign Application Priority Data

Mar. 3, 1994 [JP] Japan ..................6-033628 --.

Signed and Sealed this

Thirtieth Day of November, 1999

Attest:

Q. TODD DICKINSON

*Attesting Officer*

*Acting Commissioner of Patents and Trademarks*